(12) United States Patent
Rohs

(10) Patent No.: US 6,277,048 B1
(45) Date of Patent: Aug. 21, 2001

(54) CONICAL FRICTION RING GEAR AND PROCESS FOR REGULATING THE TRANSMISSION RATIO IN A CONICAL GEAR

(76) Inventor: Ulrich Rohs, Roonstrasse 11, 52351 Düren (DE)

( * ) Notice: Subject to any disclaimer, the term of this patent is extended or adjusted under 35 U.S.C. 154(b) by 0 days.

(21) Appl. No.: 09/376,905

(22) Filed: Aug. 18, 1999

(30) Foreign Application Priority Data

Aug. 18, 1998 (DE) .............................. 198 37 387

(51) Int. Cl.[7] .............................. F16H 15/16; F16H 15/42
(52) U.S. Cl. .................................................. 476/53; 476/55
(58) Field of Search ................... 476/53, 52, 51, 476/50

(56) References Cited

U.S. PATENT DOCUMENTS

| 1,709,346 | * | 4/1929 | Garrard ................................... 476/53 |
| 2,205,031 | | 6/1940 | Bugden .................................. 74/192 |
| 2,583,790 | * | 1/1952 | Mikina ................................... 476/53 |
| 2,865,213 | * | 12/1958 | Pernollet et al. ........................ 476/53 |
| 3,257,857 | * | 6/1966 | Davin et al. ............................ 476/53 |
| 4,229,985 | * | 10/1980 | Borello .................................. 74/192 |
| 5,575,734 | * | 11/1996 | Rondinelli ............................. 476/55 |
| 5,601,509 | * | 2/1997 | Munoz .................................. 476/53 |
| 5,607,370 | * | 3/1997 | Maslow et al. ...................... 475/196 |
| 5,924,953 | | 7/1999 | Rohs ..................................... 476/53 |

* cited by examiner

*Primary Examiner*—Sherry Estremsky
*Assistant Examiner*—Tisha D. Lewis
(74) *Attorney, Agent, or Firm*—Steven J. Hultquist; Marianne Fuierer

(57) ABSTRACT

In a conical friction ring gear having at least two conical friction wheels mounted on parallel axles and opposite one another, and a friction device effectively connecting both conical friction wheels, the risk of juddering is reduced when a torque acts on the friction device with a component which lies vertically on a plane set by both conical friction axles.

31 Claims, 5 Drawing Sheets

CONICAL FRICTION RING GEAR AND PROCESS FOR REGULATING THE TRANSMISSION RATIO IN A CONICAL GEAR

The present invention relates to a conical friction ring gear having at least two conical friction wheels mounted on parallel axles and opposite one another, and a friction device effectively connecting both conical friction wheels. The invention also relates to a process for regulating the transmission ratio in a conical gear.

Such conical friction ring gears are disclosed in DE 195 42 726 A1 and EP 0 657 663, for example. It is shown that with these conical friction ring gears smooth running cannot be guaranteed. Rather, these gears have a tendency to build up uncontrolled and uncontrollable vibrations, particularly in connection with internal combustion engines.

The object of the present invention is to make available a generic conical friction ring gear in which the risk of any uncontrollable vibration is reduced.

The first solution proposed by the present invention is a conical friction ring gear having at least two conical friction wheels mounted on parallel axles and opposite one another and a friction device effectively connecting both conical friction wheels, wherein a torque acts on the friction device with a component which lies vertically on a plane set by both conical friction axles. The friction device can be relocated along the conical friction wheels and can be designed such that it is pressed against the guide with torque.

Such an arrangement minimises the risk of any juddering of the friction device or reduces the risk to zero, because the friction device is subject to guying. In this way, a constant guide play is of no significance since the friction device lies closely on one side of the guide and is held in this adjacent position by the torque.

By way of advantage the torque is determined by forces applied to the friction device by the conical friction wheels. In this way the friction device is laid on the guide proportionally to the force acting on the friction device.

Such a solution is suited in particular to conical friction ring gears in which the friction device is disposed between the conical friction wheels. On the one hand this ensures that sufficient clearance is guaranteed for the guide of the friction device and that the friction device is stabilised all the same. On the other hand, this device still enables the friction device to be guided by displacement about an axis of rotation along both conical friction wheels.

A concrete embodiment can be produced in that the friction device is disposed between the conical friction wheels and comprises a first working area which revolves on the first of the two conical friction wheels, whereby both working areas are arranged offset relative to a rotational plane of the friction device. The term working area is understood to mean every geometrical region of the friction device revolving on a conical friction wheel. It is also understood that the working areas are subject to slight alteration during operation of the conical friction ring gear. According to the present invention, the term rotational plane is understood to mean a plane disposed vertically on a rotational axle of the friction device. Here, the term offset arrangement determines that both working areas are spaced apart variously from such a rotational plane.

Torque is applied to the friction device by the conical friction wheels adjacent to the working areas by means of such an offset arrangement of both working areas relative to a rotational plane. The guide only needs to be configured such for this torque to press the friction device against the guide.

In a relatively uncomplicated arrangement the friction device can comprise a friction ring, in turn comprising at least one bearing surface disposed radially outwards and one bearing surface disposed radially inwards, whereby each of the bearing surfaces revolves respectively on a conical friction wheel. If both bearing surfaces are arranged offset with respect to a ring plane, then torque according to the present invention occurs.

The friction device can be guided in a guide comprising a friction-type bearing between friction device and guide. Such an arrangement surprisingly ensures smooth running of the friction ring, although in the generic arrangements only little or even no lubricant is available for a guide of the friction device. Indeed, such a guide comprising a friction-type bearing is capable of advantageously calming the running of the friction device independently of the other characteristics of the conical friction ring gear. The advantages of this guide accumulate, however, with torque pressed against the guide into particularly even running of the friction device.

Because the friction device is generally fixed by means of the conical friction wheels, it should suffice for the friction device to be guided only by two guide positions. It has surprisingly eventuated that in a guide there is a tendency for any juddering to essentially decrease by means of three guide positions, whether a roller bearing or a friction-type bearing is provided at that position. This is particularly the case when the friction device is a friction ring disposed between the conical friction wheels. This friction ring can revolve only about its vertical axis so that one guide by means of one or two guide positions at most should suffice. A tendency for the ring to judder does not decrease through this alone, however, as this is the case only with three guide positions. A decrease in the tendency to judder occurs independently of the other characteristics of the conical friction ring gear, whereby the tendency to judder can be reduced through torque acting on the guide.

The friction device can be guided by a sliding carriage displaceable along at least one guide rod, whereby the sliding carriage is guided by a ball bearing guide on the guide rod. In this case any antifriction guide can act as ball bearing, where axial guiding occurs by means of revolving spheres. In particular, a spherical liner can be used. With such a bearing arrangement of the sliding carriage, which in the prior art is guided along the guide rod by means of a slide bearing, the friction device and in particular a friction ring acting as friction device can be guided more stably. Such an arrangement is particularly suited to conical friction ring gear in which the friction ring is displaced about an axis of rotation, in particular by displacement of guide rods bearing a sliding carriage guiding the friction ring. In such a mounting the forces for displacing the friction ring or the friction device stem from the conical friction wheels, as the sliding carriage is not driven particularly by itself. In this way, such an arrangement can ensure particularly smooth and even running of the friction device, in particular when it is displaced along the conical friction wheels. Such an arrangement also acts independently of the other characteristics of the conical friction ring gear of stabilisation or friction device guiding.

In order to further stabilise this guide, at least one guide rod can be profiled. Such a measure does not act directly on the guide of the friction device and it has been shown that this measure decreases the risk of vibration in the overall arrangement and thus also the risk of juddering of the friction ring. Preferably, the guide rod can be designed in profile as I-shaped or square. It is understood that such profiling serves advantageously to stabilise the overall arrangement independently of a ball bearing guide of the sliding carriage on the guide rod.

The guide rod can be attached to an adjusting frame made of sheet metal, diecast aluminium or synthetic material, especially high-performance synthetic material. Such an arrangement enables a reduction in weight. In addition, manufacture is considerably simplified, since a component comprising these materials only needs to be reshaped or formed into shape accordingly. It is true that use of such an adjusting frame is seen as an advantage for itself in order to achieve a corresponding decrease in weight and manufacturing costs. Particularly in connection with the above-described ball bearing guide or a profiled guide rod such an adjusting frame proves advantageous, because such an arrangement of the sliding carriage enables stabilising of the guide rods so that the guide of the overall arrangement is sufficiently stable despite the sheet metal adjusting frame.

The adjusting frame can be controlled by a linear motor or by a rotary motor. Stable guiding of the friction device as well as the fact that the friction device must be rotated only about an axis of rotation so that it is displaced along the conical friction wheels, enables a motor of comparatively lower efficiency to be used. This applies in particular to linear motors as well as to cost-effective rotary motors. Such an arrangement enables power-hydraulic adjusting mechanisms to be dispensed with, by means of which such a conical friction ring gear can also be constructed independently of its other characteristics.

Undesired vibrations in a generic conical friction ring gear can be prevented by at least one of the two conical friction wheels being disposed on a shaft which is in contact with the conical friction wheel by way of a constant contact area.

The constant contact area ensures stable bearing of the conical friction wheel on the shaft thereby reducing the risk of undesired vibrations through insufficient support of the conical friction wheel on the shaft. Such an arrangement in particular allows a more cost-efficient and less stable material to be used for the conical friction wheel, without a considerable drop in running qualities and accordingly the risk of vibrations.

In particularly small, generic conical friction ring gears both conical friction wheels can comprise shaft journals or bearing journals designed monobloc therewith. This also guarantees stable bearing of the conical friction wheels so that undesired vibrations can be avoided.

In such arrangements stability can be further increased by the conical friction wheel being designed compactly.

Furthermore, the abovedescribed arrangements enable a sufficiently high force to be applied to the friction device by way of the conical friction wheels in order to ensure adequate power transfer.

It is also particularly possible to make one of the conical friction wheels from steel. On the one hand, this ensures self-elasticity of the conical friction wheel whenever it acts reciprocally with the friction device. On the other hand, steel is a comparatively cost-effective material. The required stability can be guaranteed by the abovedescribed arrangement variants. It is understood, however, that a conical friction wheel made of steel is an advantage independently of the other characteristics of the conical friction ring gear.

Contrary to this, the friction device may comprise a ceramic surface. In a cost-effective manner beneficial friction properties between the conical friction wheels and the friction device can be ensured. In particular, the friction device can comprise a friction ring made of ceramic.

Particularly in conjunction with the abovedescribed arrangement a traction fluid can be provided which is responsible essentially for the friction between friction device and conical friction wheels. This means that the traction fluid is selected such that friction between friction device and conical friction wheels is substantially greater than without it. In particular, the traction fluid may comprise diamond dust or other solid particles. The use of such a traction fluid is also to advantage independently of the other characteristics of the conical friction ring gear.

The bearings of the conical friction wheels can be sealed off against a space surrounding the conical friction wheels, particularly in conjunction with the use of a traction fluid. This effectively avoids the bearings coming into contact with the traction fluid and hereby being impaired in their antifriction qualities. Such an arrangement first of all allows the use of a traction fluid which can spray around in the freely in the space surrounding the conical friction wheels. In this respect it is possible, through such an arrangement, to provide a traction fluid sump in the lower region of the space surrounding the conical friction wheels and to ensure that the traction fluid is distributed by the rotary movement of the lower conical friction wheel immersed in the traction fluid sump. The known arrangements do not permit the use of such a finely distributing traction fluid.

Moreover, sealing the conical friction wheels against the space surrounding the conical friction wheels enables several bearings to undergo one lubrication.

In this respect the bearings provided on one side of the conical friction wheel space can be arranged in interconnected bearing spaces. Common lubrication is carried out through the connecting of these bearing spaces. It is understood here that these bearing spaces can also be a constituent of a larger space provided near the conical friction wheel space.

At least two bearings provided on different sides of the conical friction wheel space can be arranged in interconnected bearing spaces. This can be done by way of corresponding lubricant lines.

On the whole, in this way a lubricant can be made available to all bearings supporting the conical friction wheels. Contrary to the known conical friction ring gears, this arrangement allows a lubricant selected especially for the bearings to be used which can be selected independently of the fluid utilised in the conical friction wheel space.

It is understood that such an arrangement of the bearing spaces is advantageous independently of the use of a traction fluid or independently of the other characteristics of the conical friction ring gear.

The abovedescribed arrangement with common bearing spaces proves particularly advantageous if the conical friction ring gear comprises at least one conical roller bearing. Conical roller bearings generate excess pressure towards the conoid frustum, which is so great that no sealing can be provided for the conical roller bearing on this side because such sealing is burst open by the pressure exerted there.

If a retention space is, however, provided between this seal and the conical roller bearing, from which at least one lubricant supply line exits to another bearing, this pressure can serve to supply lubricant.

In this way, a lubricating cycle can be set up which can do without any additional lubricating pump or similar.

In addition, a lubrication sump, out of which lubricant supplies the conical roller bearing, can be provided at the conical apex of the conical roller bearing. This lubrication sump can be connected to a corresponding feedback line from another bearing.

Use of a conical roller bearing for lubricant supply, in particular to other bearings of a mechanical arrangement, can also be applied to advantage independently of all abovementioned characteristics. In particular, an especially reliable lubricant supply is ensured hereby which is very simple to realise in structural terms.

At least one conical friction wheel can comprise a spherical roller bearing. Here, the quiet running and the torque transmitted by the conical friction ring gear can be increased, since such a bearing arrangement allows both conical friction wheels as well as the friction device to load to the point where the conical friction wheels or the shafts bearing the conical friction wheels start to deform. Even under such a high load safe and smooth running of the conical friction ring gear can be guaranteed.

In addition to this, at least one conical friction wheel can be supported by means of a bearing acting axially, which conical friction wheel is arranged to move in a radial direction. Very high axial forces can be absorbed by such a bearing, whereby the bearing can follow any deflection in the shaft owing to its mobility in a radial direction. Examples of such a bearing are axial angular contact ball bearing, axial cylinder roller bearing, axial ball bearing, axial needle roller bearing, as well as ball track bearing and angular contact ball bearing which are mounted with a corresponding radial clearance. A conical roller bearing of the abovedescribed type can also find application here.

It is in particular also possible to provide this axially acting bearing on the same side of the conical friction wheel as a spherical roller bearing. The bearing functions can thus be distributed to both bearings.

Hydraulic means can be provided which can charge a conical friction wheel with an axially directed force preferably going from the frustum to the conical apex. The vibration between conical friction wheels and friction device can be controlled by such an arrangement in a structurally simple manner. This can occur in particular depending on a load, but depending also on a selected acceleration or speed.

Such a hydraulic adjustment potential is essentially more flexible than mechanical displacement known previously.

The hydraulic means can comprise in particular a piston displaceable in an axial direction relative to the conical friction wheel and acting on a corresponding bearing of the conical friction wheel. Mechanical means can also be provided which enable a charge of force. In particular, this can be disk springs which exert an axial prestressing force on the conical friction wheel or on the abovedescribed cylinder.

The present invention also makes available a process for regulating the transmission ratio in a conical gear, wherein the transmission ratio can be adjusted depending on a relative position of a rotating friction element and the friction element can be altered by modification of a rotary position relative to an axis in its relative position, whereby this rotary position of the friction element is used as an actuator for the regulating. This can guarantee very precise and smooth-running regulating of the transmission ratio.

The rotary position of the friction element can be adjusted by rotation of the abovedescribed frame or the abovedescribed guide rods, for example. A motor can be used for this purpose, also as described hereinabove.

To raise the regulating precision the rotary position of the friction element can be determined and used for regulating. This happens preferably through use of the determined rotary position as control value, so that this determined rotary position is used only indirectly for regulating.

The relative position of the friction element with respect to the conical can also be determined and used to regulate.

This also occurs preferably as control value. The determined relative position of the friction element can also be used directly for regulating, particularly in fast displacement processes.

A particularly smooth running of the conical gear can be guaranteed by the abovedescribed regulating process. Such a closed loop can be relatively well controlled in its vibratory behaviour.

A speed ratio between a shaft on the input side and a shaft on the output side of the conical gear can be regulated as a control value. Such a control value is relatively easy to determine; it can be done by two correspondingly arranged tachometers.

The abovedescribed processes and arrangements are all suited to improve the smooth running of a conical gear or a conical friction ring gear. The abovedescribed characteristics can improve the smooth running either individually or independently of one another. The combination of individual characteristics offers surprisingly substantial improvements in such gears, not to be expected from the mere addition of a characteristic.

Further advantages, aims and properties of the present invention will be clarified hereinafter with reference embodiments explained in the accompanying diagram, in which.

Figure 1:
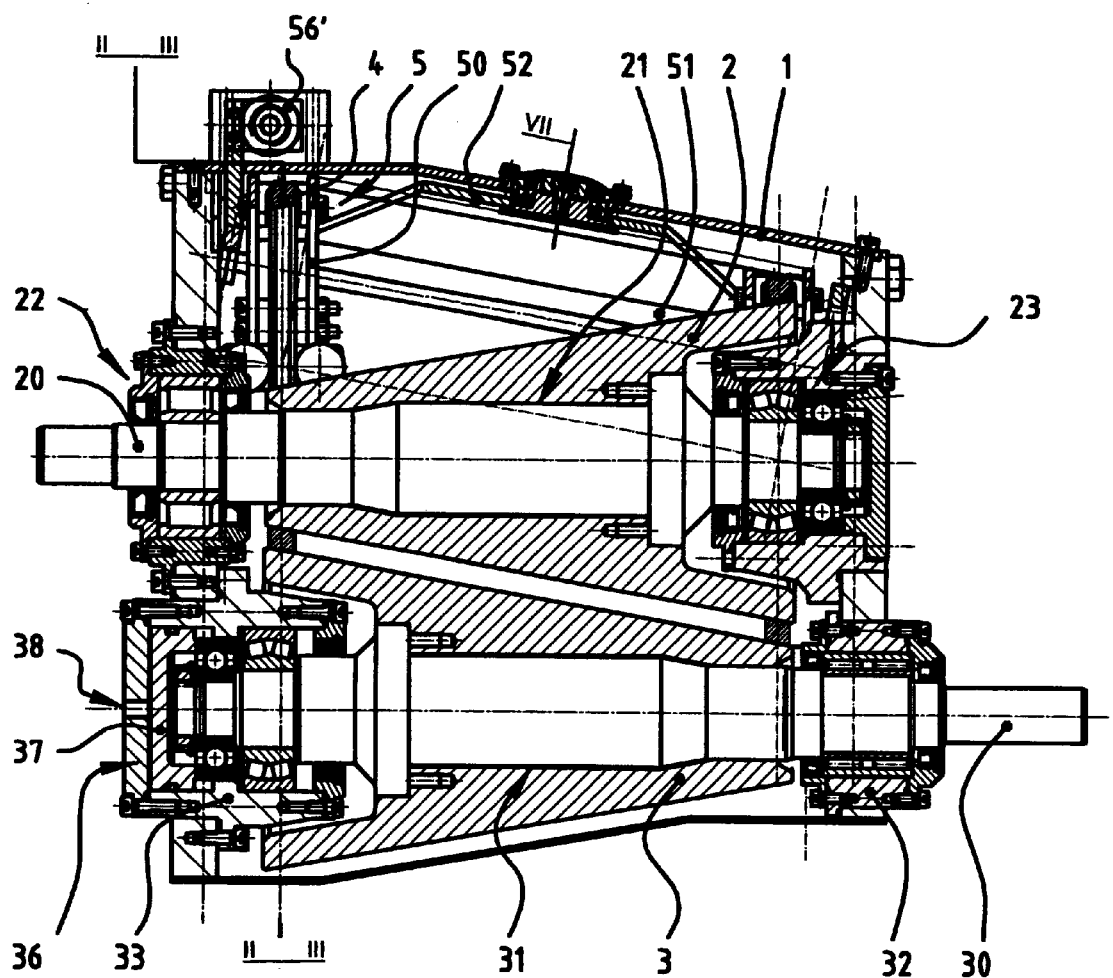
FIG. 1 shows a conical friction ring gear in cross-section.
Figure 2:
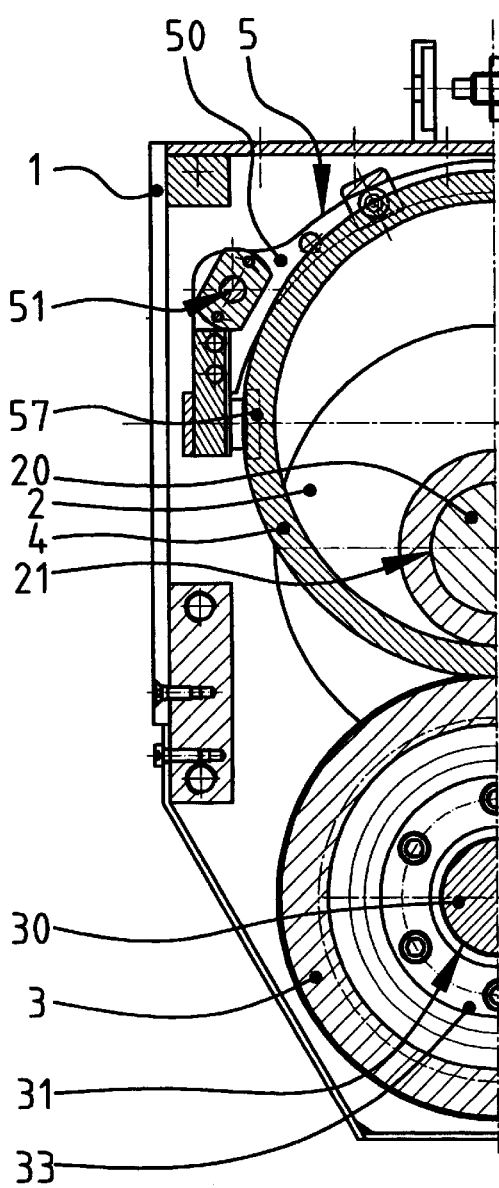
FIG. 2 shows the conical friction ring gear according to FIG. 1 along line II—II in FIG. 1.
Figure 3:
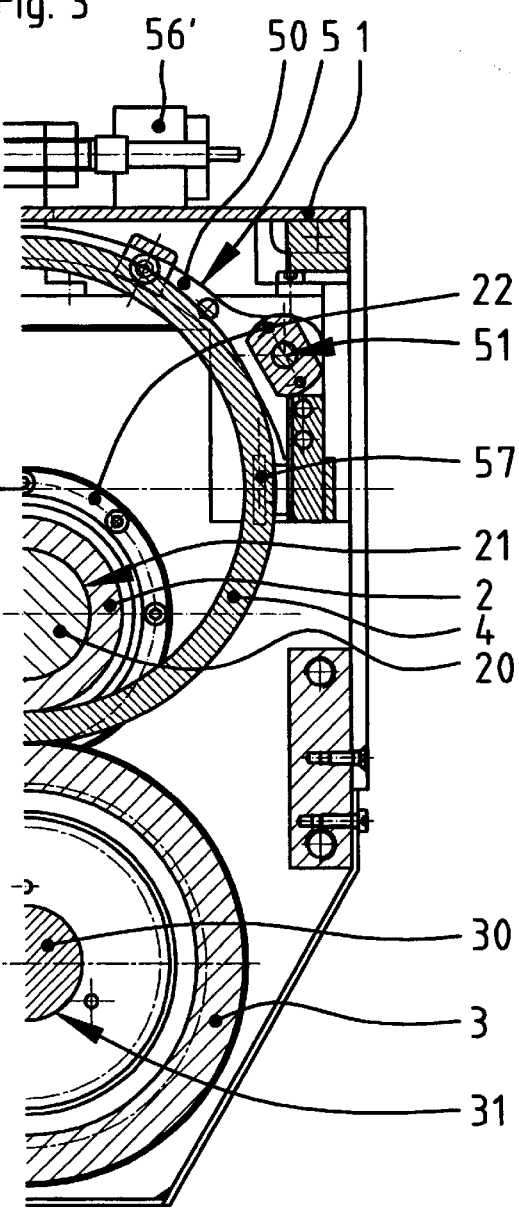
FIG. 3 shows the conical friction ring gear according to FIG. 1 along line III—III in FIG. 1.
Figure 4:
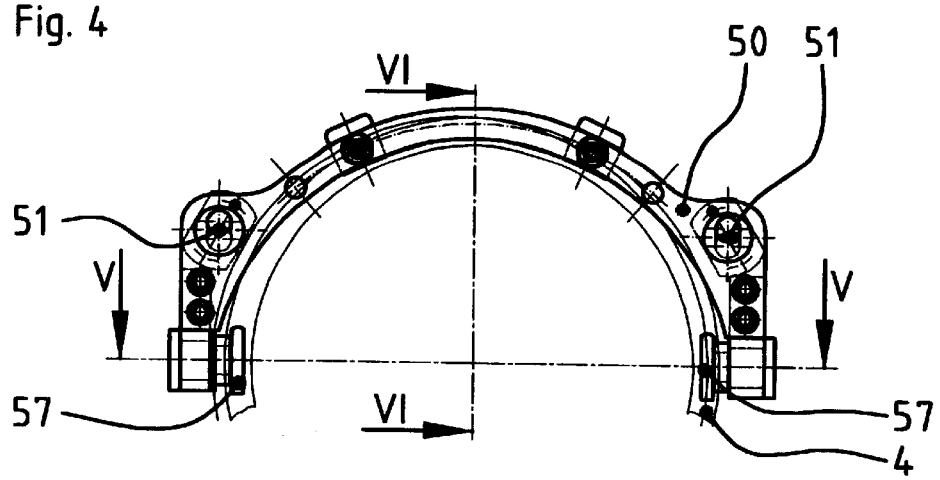
FIG. 4 is a side view of a guide sliding carriage as well as a friction ring guided in this guide sliding carriage for the conical friction ring gear according to FIG. 1.
Figure 5:
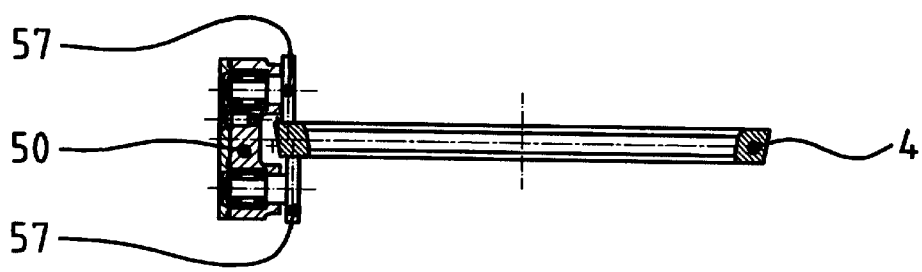
FIG. 5 is a section through the friction ring and its guide sliding carriage according to FIG. 4 along line V—V in FIG. 4.

In conical friction ring gears as illustrated in FIG. 1 two conical friction wheels 2, 3 opposite to one another on parallel axles are arranged in a housing 1. Both conical friction wheels 2, 3 are effectively connected by a friction ring 4 acting as friction ring. This friction ring 4 rotates between both conical friction wheels 2, 3 and is in contact with the casing surfaces of both conical friction wheels 2, 3.

Figure 6:
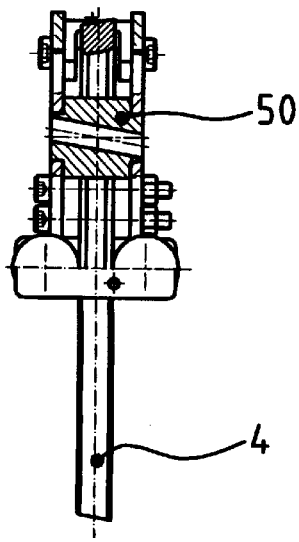
FIG. 6 is a section through the friction ring and its guide sliding carriage according to FIG. 4 along line VI—VI in FIG. 4.
Figure 9:
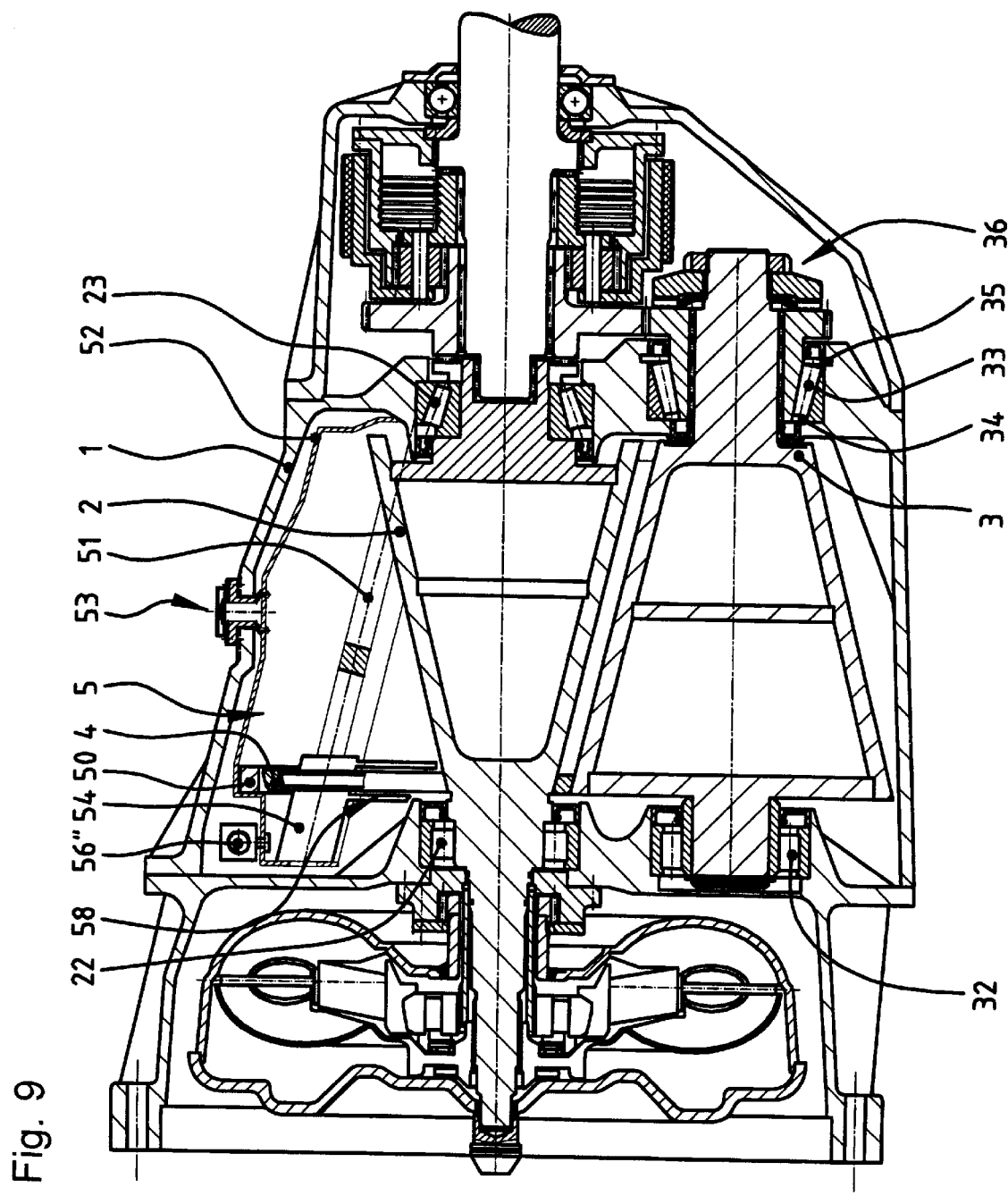
FIG. 9 is a section through another conical friction ring gear in similar view to FIG. 1.

Friction ring 4 is mounted in a guide 5 and can be displaced by means of this guide 5 which comprises a sliding carriage 50 guided on two guide rods 51. As apparent from FIG. 6, while sliding carriage 50 of the first conical friction ring gear is guided in a friction guide on guide rods 51, this guiding in the embodiment illustrated in FIG. 9 is undertaken by a spherical liner 54. The guide rod of the conical friction ring gear illustrated in FIG. 9 is profiled square.

Figure 7:
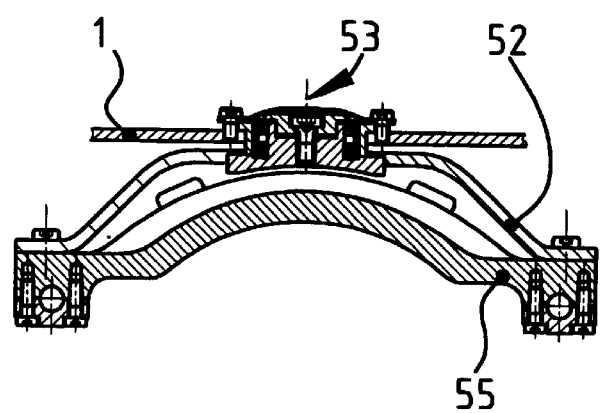
FIG. 7 is a section through an adjusting frame of the conical friction ring gear according to FIG. 1 along line VII—VII in FIG. 1.

Both guide rods 51 of both conical friction ring gears are mounted on an adjusting frame 52. While adjusting frame 52 of the conical friction ring gear illustrated in FIG. 9 is connected directly to guide rods 51, in the conical friction ring gear illustrated in FIGS. 1 to 7 this connection is made indirectly by way of a stabilising union bow 55, as in FIG. 7.

The adjusting frame is attached to housing 1 displaceably about an axis of rotation 53. It is displaced ib the conical friction ring gear illustrated in FIGS. 1 to 7 by means of a rotation motor 56', while adjusting frame 52 is controlled by means of a linear motor 56" in the conical friction ring gear illustrated in FIG. 9.

In the conical friction ring gear illustrated in FIGS. 1 to 7 the friction ring is guided by roller pairs 57 provided at two guide positions (see, in particular, FIGS. 2 to 5). In the conical friction ring gear according to FIG. 9 friction ring 4, however, is guided in a friction guide 58. As is clearly seen, several guide positions can be provided instead of just the two guide positions, as in FIG. 4 or FIG. 9.

Figure 8:
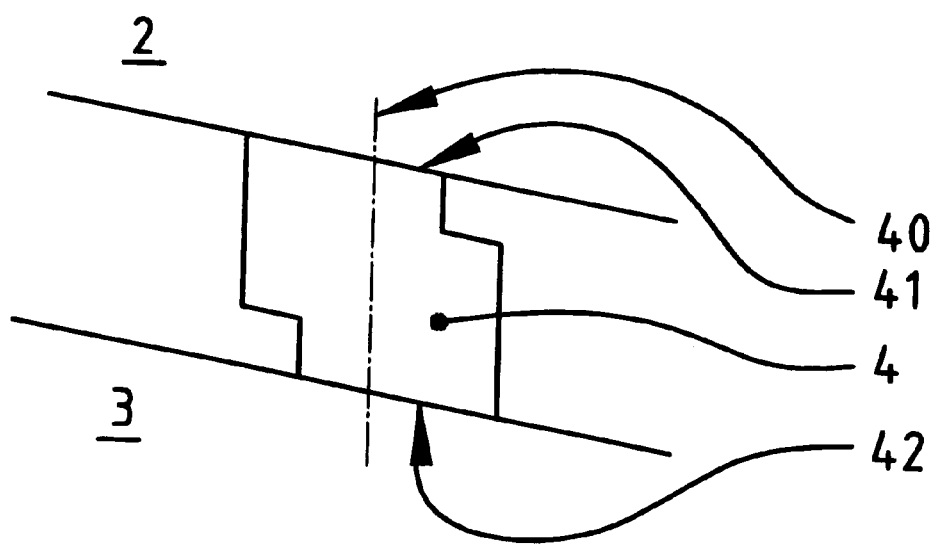
FIG. 8 is a diagrammatic sectional view of the friction ring of the conical friction ring gear arranged between two conical friction wheels.

Both friction rings 4 of both illustrated conical friction ring gears rotate about an axle directed parallel to the axles of conical friction wheels 2, 3. It is also feasible to arrange the axle at an angle thereto. In particular, the axle can also be provided parallel to the casing surfaces. Accordingly, friction rings 4 revolve in a rotational plane which stands vertically on this axle of rotation. Illustrated as a rotational plane in the diagrammatical representation according to FIG. 8 is such an axis of rotation. This plane 40 also stands for an annular plane.

As seen from FIG. 8, friction ring 4 comprises two bearing areas or bearing surfaces 41, 42 with which it revolves on one of conical friction wheels 2, 3. As FIG. 8 shows, both bearing surfaces 41, 42 are arranged offset relative to plane 6. Torque is exerted on the friction ring by both conical friction wheels 2, 3.

Determined by its symmetry friction ring 4 can be altered in its position essentially only about its vertical axis. In addition, slight tilting is possible.

The torque acting on friction ring 4 is selected such that it forcefully charges friction ring 4 in the last-mentioned direction. At this point friction ring 4 is pressed against guide 5. On the other hand it is conceivable to load friction ring 4 with an opposing torque.

The abovedescribed torque as well as adequate frictional force between conical friction wheels 2, 3 and friction ring 4 is guaranteed by conical friction wheels 2, 3 being axially distorted against one another. In order to contact this guying both conical friction wheels 2, 3 of the conical friction ring gear illustrated in FIGS. 1 to 7 are arranged respectively on a shaft 20, 30 which are in contact respectively with conical friction wheels 2, 3, by way of an extensively penetrating contact area 21, 31. Both conical friction wheels 2, 3 of this conical friction ring gear are otherwise designed integrally.

In order to increase the stability of the conical friction wheels 2, 3 of the conical friction ring gear illustrated in FIG. 9 comprising a cavity they can comprise shaft journals or bearing journals designed monobloc therewith. An integral design of these conical friction wheels 2, 3 is also possible.

Conical friction wheels 2, 3 of both conical friction ring gears are designed from steel. Friction ring 4 consists of a ceramic component. Provided in the lower section of housing 1 is a sump of traction fluid. The traction fluid can be substituted by diamond powder. The quantity of traction fluid is measured such that a lower section of friction ring 3 is immersed in this sump and equilibrium is adjusted between the traction fluid distributed in housing 1 and the traction fluid in the sump when the conical friction ring gear is operating.

Conical friction wheels 2, 3 are mounted by means of bearings 22, 23 or 32, 33. Bearings 22, 23 or 32, 33 are located respectively in sealed bearing spaces so that no traction fluid penetrates into these bearing spaces or onto these bearings 22, 23 and 32, 33. All bearing spaces are interconnected by way of a lubricating line through which lubricating oil circulates. In the conical friction ring gear illustrated in FIGS. 1 to 7 this circulation is maintained by an oil pump, while it occurs in the conical friction ring gear illustrated in FIG. 9 by means of bearings 23 and 33. The latter bearings are designed as conical roller bearings. Provided at the conical apex of conical roller bearing 3 is a bearing oil pump 34, while a retention space is located on the side of the frustum of bearing 33, into which the bearing oil is pumped from conical roller bearing 33. Bearing roller lines go from retention space 35 to the other bearings.

All bearings 22, 23 and 32, 33 absorb the resulting radial forces. On the other hand, bearings 23 and 33 act after the absorption of axial forces. This is ensured in the conical friction ring gear according to FIG. 9 by conical roller bearings 23 and 33, arranged accordingly opposite. In this conical friction ring gear bearings 22 and 32 are designed as cylinder roller bearings.

On the other hand the axial forces in bearings 23 and 33 of the conical friction ring gear illustrated in FIGS. 1 to 7 are compensated by a combination of spherical roller bearings and deep groove ball bearings. Bearings 23 and 33 are arranged here on different sides of the conical friction ring gear. The spherical roller bearing serves to absorb radial and axial forces. It is suitable in particular for also following any deflection of shafts 20 or 30. The spherical roller bearing, however, acts essentially to absorb axil forces and can be moved radially in housing 1.

For the purpose of ensuring axial guying both conical friction ring gears respectively comprise a tensioning device through which the conical friction wheel can be charged by an axially directed force going from frustum to conical apex. A disk spring arrangement and a conicalled cam coupling is provided in the conical friction ring gear illustrated in FIG. 9. The conicalled cam coupling enables torque adaptation, while the disk spring arrangement determines a base load. The conicalled cam coupling comprises radial conicals which override one another under a torque acting on conical friction wheel 3, hereby increasing the contact force. In the conical friction ring gear illustrated in FIGS. 1 to 7 hydraulic means 36 are provided for this purpose. Here, it is an axially displaceable cylinder 37 which can be driven hydraulically through an aperture 38 and acts on the deep groove ball bearing of bearing 33.

The transmission ratio of both conical friction ring gears is regulated by tachometers being arranged both on drive shaft 20 and on drive shaft 30. The speed ratio between both shafts 20, 30 acts as control value. The speed ratio is regulated by the rotary position of friction ring 4. This rotary position can be altered by motors 56' and 56". Should the speed ratio deviate from the desired speed ratio, a corresponding change of position is produced by motors 56' and 56". With respect thereto, the friction ring roams along the casing surface of conical friction wheels 2, 3. If the desired speed ratio is attained, there is a corresponding change in the rotary position of friction ring 4 which is directed parallel to the axes of the conical friction wheel.

The rotary position of friction ring 4 is determined by the position of motors 56' or 56" and used as control value.

Furthermore, the relative position of friction ring 4 is determined. The measured relative position also enters the closed loop as actuator. Use is made here of the relative position only in the event of a comparatively rapid displacement of friction ring 4.

What is claimed is:

1. A conical friction ring gear having at least two conical friction wheels mounted on parallel axles and opposite one another, and a friction device disposed between the friction wheels and effectively connecting both conical friction wheels, wherein said friction device lies perpendicular to both conical friction axles and comprises a first working area contacting the first of the two friction wheels and a second working area contacting the second of the two friction wheels, and wherein both working areas are arranged offset relative to a rotational plane of the friction device.

2. A conical friction ring gear as claimed in claim 1, characterized in that a torque is applied to the friction device by the conical friction wheels, wherein magnitude of said torque is determined by forces applied by the conical friction wheels to the friction device.

3. A conical friction ring gear as claimed in claim 2, such torque functions to press tile friction device against a guide and to stabilize the friction device.

4. A conical friction ring gear as claimed in claim 1, characterized in that the friction device comprises a friction ring, which in turn comprises at least one bearing surface disposed radially outwards and one bearing surface disposed radially inwards, whereby both bearing surfaces are arranged offset to an annular rotational plane of said friction ring.

5. A conical friction ring gear as claimed in claim 1, characterized in that the friction device is guided in a guide comprising a friction-type bearing between the friction device and the guide.

6. A conical friction ring gear as claimed in claim 1, characterized in that the friction device is guided at least over three guide positions.

7. A conical friction ring gear having at least two conical friction wheels mounted on parallel axles and opposite one another, and a friction device effectively connecting both conical friction wheels, characterized in that a torque acts on the friction device with a component which lies vertically on a plane set by both conical friction axles, and that the friction device is guided by a sliding carriage displaceable along at least one guide rod, whereby the sliding carriage is guided by a ball bearing guide on the guide rod.

8. A conical friction ring gear as claimed in claim 7, characterized in that the guide rod is profiled preferably as T-shaped or square.

9. A conical friction ring gear as claimed in claim 7, characterized in that the guide rod is attached to an adjusting frame made of sheet metal, diecast aluminum or synthetic material.

10. A conical friction ring gear as claimed in claim 9, characterized in that the adjusting frame is controlled by a linear motor.

11. A conical friction ring gear as claimed in claim 9, characterized in that the adjusting frame is controlled by a rotary motor.

12. A conical friction ring gear having at least two conical friction wheels mounted on parallel axles and opposite one another, and a friction device disposed between the friction wheels and effectively connecting both conical friction wheels, characterized in that said friction device comprises a first working area contacting the first of the two friction wheels and a second working area contacting the second of the two friction wheels, wherein both working areas are arranged offset relative to a rotational plane of the friction device, and wherein at least one of both conical friction wheels is arranged on a shaft which is in contact with the conical friction wheel by way of a constant contact area.

13. A conical friction ring gear having at least two conical friction wheels mounted on parallel axles and opposite one another, and a friction device disposed between the friction wheels and effectively connecting both conical friction wheels, characterized in that said friction device comprises a first working area contacting the first of the two friction wheels and a second working area contacting the second of the two friction wheels, wherein both working areas are arranged offset relative to a rotational plane of the friction device, and wherein both conical friction wheels comprise bearing journals or shaft journals designed monobloc there with.

14. A conical friction ring gear as claimed in claim 12, characterized in that the conical friction wheel is integral with the shaft.

15. A conical friction ring gear as claimed in claim 1, characterized in that at least one conical friction wheel is made of steel.

16. A conical friction ring gear as claimed in claim 1, characterized in that the friction device comprises a ceramic surface.

17. A conical friction ring gear as claimed in claim 16, characterized in that the friction device comprises an annular ring made of ceramic.

18. A conical friction ring gear as claimed in claim 1, characterized in that in a space surrounding the conical friction wheels a traction fluid is provided with diamond dust or other solid particles.

19. A conical friction ring gear as claimed in claim 1, characterized in that bearings of the conical friction wheels are sealed off against a space surrounding the conical friction wheels.

20. A conical friction ring gear as claimed in claim 19, characterized in that the bearings provided on one side of the conical friction wheel space are arranged in interconnecting spaces.

21. A conical friction ring gear as claimed in claim 19, characterized in that two of the bearings provided on different sides of the conical friction wheel space are arranged in interconnected bearing spaces.

22. A conical friction ring gear as claimed in claim 1, characterized by at least one conical roller bearing.

23. A conical friction ring gear having at least two conical friction wheels mounted on parallel axles and opposite one another, and a friction device effectively connecting both conical friction wheels, characterized in that a torque acts on the friction device with a component which lies vertically on a plane set by both conical friction axles, and wherein at least one conical roller bearing is sealed to a frustum, and a retention space is provided adjacent the conical roller bearing from which at least one lubricant supply line exists.

24. A conical friction ring gear having at least two conical friction wheels mounted on parallel axles and opposite one another, and a friction device effectively connecting both conical friction wheels, characterized in that a torque acts on the friction device with a component which lies vertically on a plane set by both conical friction axles, and wherein a lubrication sump is provided at the conical apex of the conical roller bearing.

25. A conical friction ring gear as claimed in claim 1, characterized in that at least one conical friction wheel comprises a spherical roller bearing.

26. A conical friction ring gear as claimed in claim 1, characterized in that at least one conical friction wheel comprises a bearing acting axially which is arranged to move in a radial direction and which is arranged preferably on one side of the conical friction wheel with a spherical roller bearing.

27. A conical friction ring gear as claimed in claim 1, characterized in that hydraulic means are provided which can charge at least one conical friction wheel with an axially directed force preferably going from the frustum to the conical apex.

28. A process for regulating the transmission ratio in a conical gear, wherein the transmission ratio can be adjusted depending on a relative position of a rotating friction element and the friction element can be altered by modification of a rotary position along an axis of rotation in its relative position, characterized in that the rotary position is used as an actuator of friction element.

29. A regulating process as claimed in claim 28, characterized in that the rotary position of the friction element is determined and is used for regulating, preferably as control value.

30. A regulating process as claimed in claim 28, characterized in that the relative position of the friction element is determined and is used for regulating, preferably as control value.

31. A regulating process as claimed in claim 28, characterized in that a speed ratio is regulated as a control value between a shaft on the input side and a shaft on the output side.

* * * * *

UNITED STATES PATENT AND TRADEMARK OFFICE
CERTIFICATE OF CORRECTION

PATENT NO. : 6,277,048 B1
DATED : August 21, 2001
INVENTOR(S) : Ulrich Rohs

It is certified that error appears in the above-identified patent and that said Letters Patent is hereby corrected as shown below:

Title page,
Item [30], Foreign Application Priority No., change "198 37 387" to -- 198 37 368 --

Column 9,
Line 14, change "claim 2, such" to -- claim 2, characterized in that such --
Line 15, change "tile" to -- the --
Line 45, change "T-shaped" to -- I-shaped --

Signed and Sealed this

Seventh Day of May 2002

Attest:

Attesting Officer

JAMES E. ROGAN
*Director of the United States Patent and Trademark Office*